United States Patent
Nair et al.

(10) Patent No.: US 10,789,370 B2
(45) Date of Patent: Sep. 29, 2020

(54) EXTENDING A ROOT COMPLEX TO ENCOMPASS AN EXTERNAL COMPONENT

(71) Applicant: INTEL CORPORATION, Santa Clara, CA (US)

(72) Inventors: Mohan K. Nair, Portland, OR (US); Rajesh M. Sankaran, Portland, OR (US); Utkarsh Y. Kakaiya, Folsom, CA (US); Zhenfu Chai, Shanghai (CN); David M. Lee, Portland, OR (US); Pratik M. Marolia, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 662 days.

(21) Appl. No.: 15/470,270

(22) Filed: Mar. 27, 2017

(65) Prior Publication Data

US 2018/0276394 A1 Sep. 27, 2018

(51) Int. Cl.
| | |
|---|---|
| *G06F 9/4401* | (2018.01) |
| *G06F 21/60* | (2013.01) |
| *G06F 21/85* | (2013.01) |
| *G06F 21/57* | (2013.01) |
| *G06F 12/0815* | (2016.01) |
| *G06F 13/42* | (2006.01) |
| *H04L 29/06* | (2006.01) |

(52) U.S. Cl.
CPC .......... *G06F 21/602* (2013.01); *G06F 9/4403* (2013.01); *G06F 12/0815* (2013.01); *G06F 21/575* (2013.01); *G06F 21/85* (2013.01); *G06F 9/4406* (2013.01); *G06F 9/4408* (2013.01); *G06F 13/4282* (2013.01); *G06F 2212/1052* (2013.01); *G06F 2213/0026* (2013.01); *H04L 63/04* (2013.01)

(58) Field of Classification Search
None
See application file for complete search history.

(56) References Cited

U.S. PATENT DOCUMENTS

| | | | | |
|---|---|---|---|---|
| 2006/0239287 | A1* | 10/2006 | Johnsen | H04L 12/4625 370/412 |
| 2014/0237156 | A1* | 8/2014 | Regula | G06F 13/4027 710/314 |

* cited by examiner

*Primary Examiner* — Paul Yen
(74) *Attorney, Agent, or Firm* — Schwabe, Williamson & Wyatt, P.C.

(57) ABSTRACT

In accordance with embodiments disclosed herein, there is provided systems and methods for extending a root complex to encompass an external component. A processor includes a processor core and root complex circuitry coupled to the processor core. The processor core is to execute a basic input/output system (BIOS) and an operating system (OS). The root complex circuitry includes a coherent interface port and a downstream port. The root complex circuitry is to couple to an external component via the downstream port and the coherent interface port. The BIOS, to extend a root complex beyond the root complex circuitry to encompass the external component, is to obfuscate the downstream port from the OS, define a virtual root bridge for the external component, and enable a security check at the external component to provide protection for the coherent interface port and the downstream port.

23 Claims, 6 Drawing Sheets

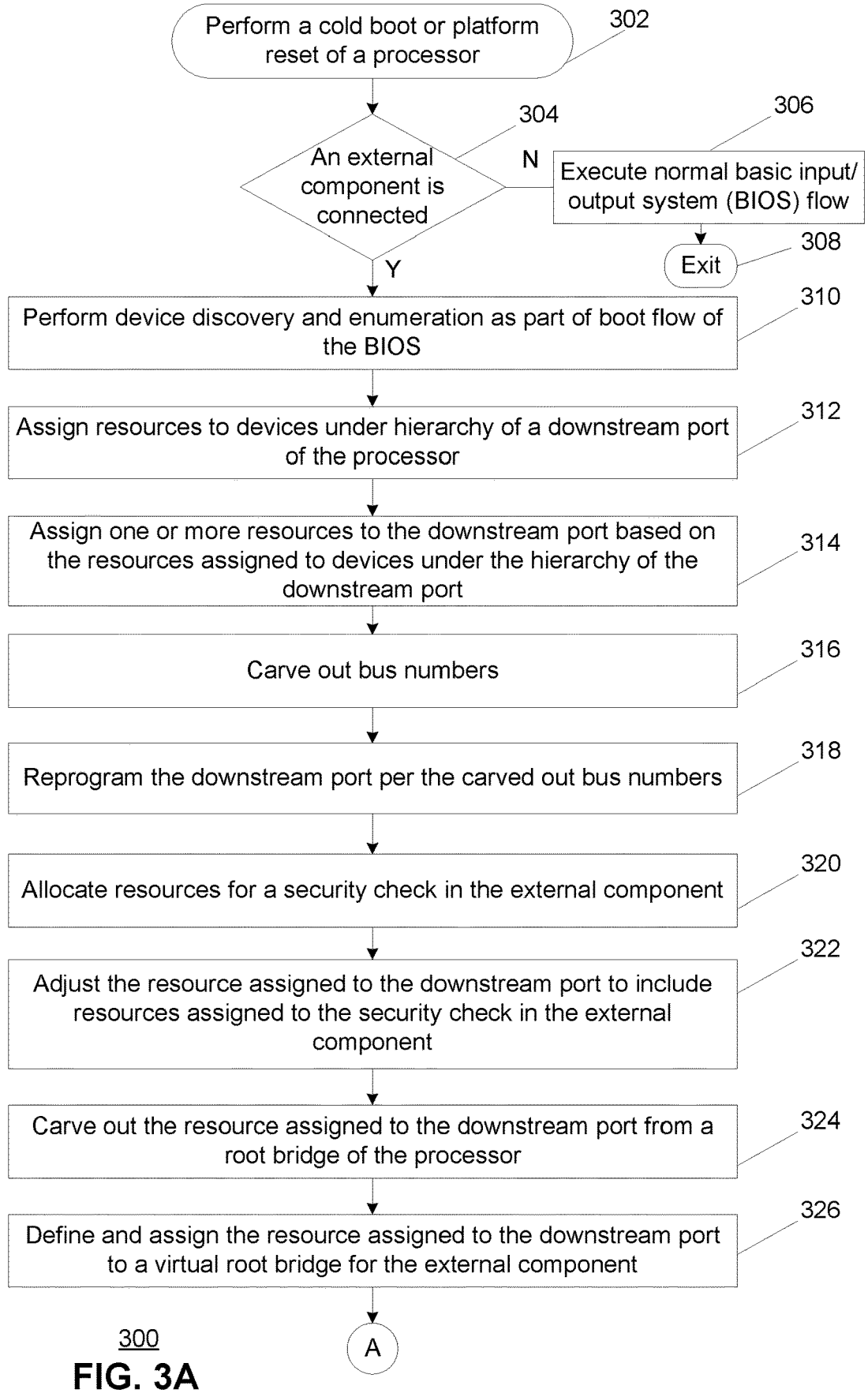

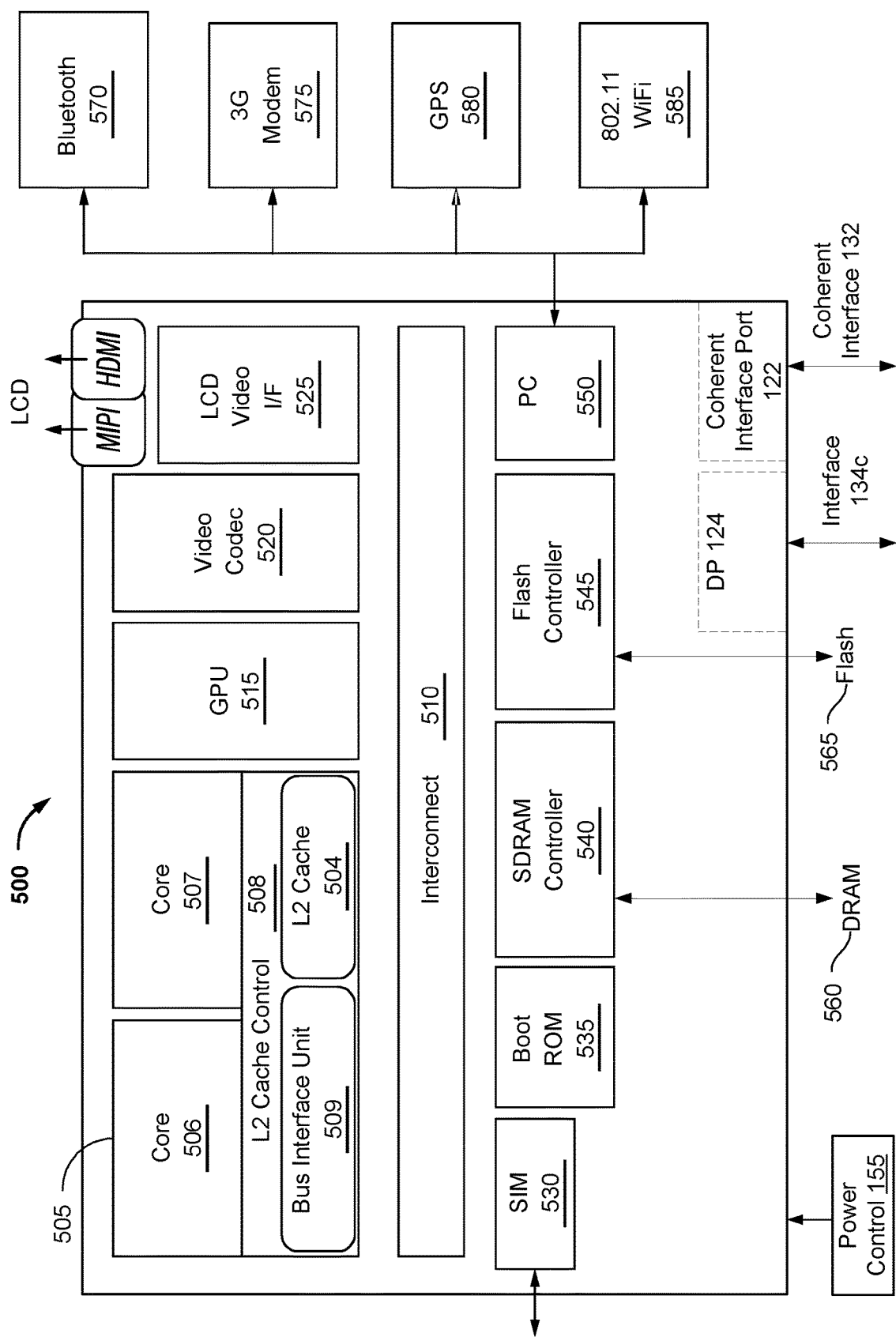

EXTENDING A ROOT COMPLEX TO ENCOMPASS AN EXTERNAL COMPONENT

BRIEF DESCRIPTION OF THE DRAWINGS

FIGS. 3A-B illustrate a flow diagram of a method of extending a root complex to encompass an external component, according to one embodiment.

FIG. 5 illustrates a system on a chip (SOC) design, according to one embodiment.

DESCRIPTION OF EMBODIMENTS

Figure 1:
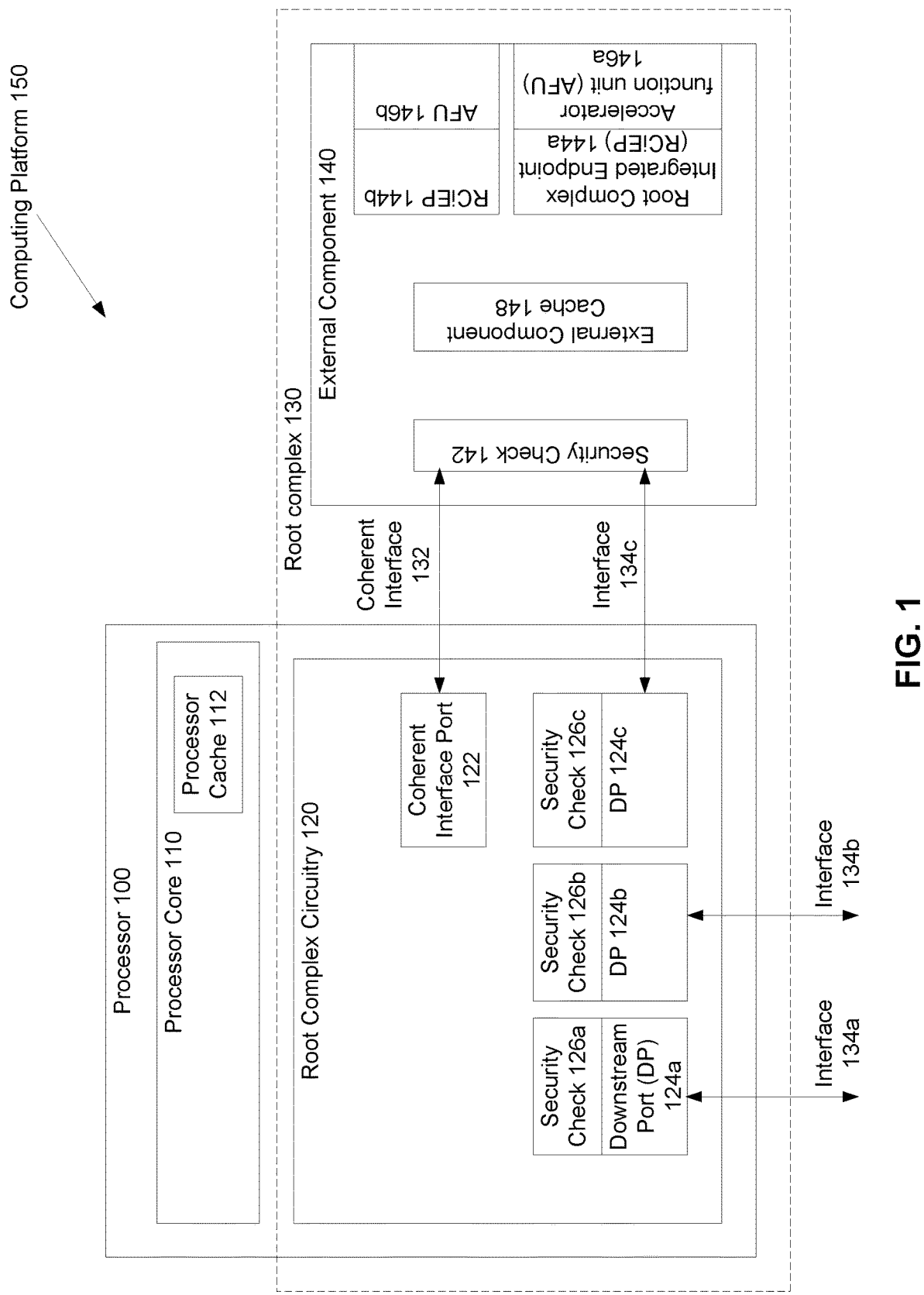
FIG. 1 illustrates a computing platform including a processor and an external component that are coupled via a downstream port and a coherent interface port of the processor, according to one embodiment.

A processor may have downstream ports and a coherent interface port that are within a root complex of the processor. A coherent interface port may allow a higher information transfer rate or bandwidth capacity than a downstream port. The coherent interface port may allow maintaining cache coherency between the processor and an external component coupled to the coherent interface port. All accesses to the processor through a downstream port go through a security check, but accesses to the processor through the coherent interface port do not have a security check.

The coherent interface port is conventionally used for coupling a first processor and a second processor. The ports that are exposed externally are the downstream ports and are protected by their corresponding security checks in the root complex. Although the coherent interface port does not have a security check, all external accesses must go through a downstream port first where the existing security check provides the required security. As a result, the coherent interface port coupling two processors may not have security vulnerability.

If an external component were coupled to a processor via a downstream port and a coherent interface port, the external component (e.g., an accelerator function unit (AFU) implemented as part of the external component, a die that is made up of multiple devices) may use the downstream port and/or coherent interface port to access the processor. All accesses from the AFU over the downstream port are protected by security checks in the root complex, but all accesses from the AFU over the coherent interface port are not protected due to lack of security check on the coherent interface path. As a result, the processor is vulnerable to misbehaving and/or rogue AFU if coupled to an external component via the coherent interface port of the processor.

If an external component were coupled to a processor via a downstream port and a coherent interface port of the processor, a security check could be provided in the external component for transactions over the coherent interface port. The AFU would have two different security check paths based on which interface the AFU uses for the data transfer (e.g., a first security check via the downstream port and a second security check via the coherent interface port). Software stack may not have a mechanism to keep the two security checks synchronized with one another as this architecture violates the requirement that the security check must be at the root of hierarchy.

The embodiments of devices, systems, and methods, as disclosed herein, provide coupling of a processor, via a downstream port and a coherent interface port, to an external component and extending the root complex of the processor to encompass the external component. To extend the root complex to encompass the external component, the basic input/output system (BIOS), executed by the processor, obfuscates the downstream port from the operating system (OS), defines a virtual root bridge for the external component (e.g., encompassing the external component), and enables a security check at the external component to provide protection for the coherent interface and the downstream port. The embodiments described herein allow an external component to have the benefits of being coupled to a processor via a coherent interface (e.g., higher information transfer rate, higher bandwidth capacity, etc.), while providing a security check that does not violate the architectural requirement that the security check must be at the root of a hierarchy.

FIG. 1 illustrates a computing platform 150 including a processor 100 and an external component 140 that are coupled via a downstream port 124 and a coherent interface port 122 of the processor 100, according to one embodiment.

The processor 100 (e.g., processing device) may be an integrated circuit. The processor includes a processor core 110 (e.g., central processing unit (CPU), core) and root complex circuitry 120 (e.g., uncore, uncore circuitry).

The processor core 110 includes components of the processor 100 involved in executing instructions (e.g., arithmetic logic unit (ALU), floating-point unit (FPU), level 1 (L1) and level 2 (L2) cache). The processor core 110 executes a basic input/output system (BIOS) and an operating system (OS) (e.g., as described herein, an OS may be an operating system for a native system or a hypervisor (virtual machine manager (VMM)) for a virtualized system). BIOS may be firmware used to perform hardware initialization during the booting process (e.g., power-on startup) and may provide runtime services for operating systems and software programs. BIOS may be the first software that is ran when a processor is powered on. An OS is system software that manages hardware and software resources. Firmware (e.g., BIOS) does not require an OS to function.

The root complex circuitry 120 may be portions of the processor 100 that are not in the processor core 110. The root complex circuitry 120 may be circuitry that is not in the processor core 110, but is closely connected to the core for the processor to achieve high performance. The root complex circuitry 120 may have functions such as one or more of coherent interface controllers, on-die memory controller, one or more downstream ports, and Thunderbolt™ controller. The root complex circuitry 120 is coupled to the processor core 110.

The processor core 110 may execute the BIOS and the BIOS may encompass the root complex circuitry 120 in a root complex 130 (e.g., CPU complex). The root complex 130 denotes the root of an input/output (I/O) hierarchy that connects the processor 100 to I/O devices. The root complex 130 may support one or more downstream ports 124. The processor may communicate with the external component 140 using an interconnect standard (e.g., peripheral component interconnect express (PCIe®), legacy, etc.). Each interface (e.g., downstream port 124) may define a separate hierarchy domain and each hierarchy domain may have a single endpoint. An endpoint is a type of function that can be the requester or completer of a transaction either on its own behalf or on behalf of a distinct device (e.g., an attached graphics controller, a host controller). The root complex 130 may provide a secure domain.

The root complex circuitry 120 may have one or more downstream ports 124. The downstream ports 124 may be endpoints. The downstream ports 124 may support communication over a physical transmission medium.

Each downstream port 124 has a corresponding security check 126 to protect the processor 100 from external accesses (e.g., so that the processor 100 is not vulnerable to misbehaving and/or rogue user defined accelerator (e.g., AFU)).

The root complex circuitry 120 has a coherent interface port 122. The coherent interface port 122 may allow for a higher information transfer rate or bandwidth capacity than a downstream port. The coherent interface port 122 does not have a security check in the root complex circuitry 120.

An external component 140 (e.g., field-programmable gate array (FPGA)) may be a second integrated circuit. The external component 140 may be an FPGA or a die with multiple devices that communicate using an interconnect standard (e.g., PCIe®, etc.). The multiple devices (e.g., AFU 146a, AFU 146b, etc.) may communicate with the processor 100 via the coherent interface port 122. The external component 140 may be coupled to the processor via the coherent interface port 122 and downstream port 124 of the root complex circuitry 120. The external component 140 may be coupled to the coherent interface port 122 via a coherent interface 132 (e.g., a physical transmission medium). The external component 140 may be coupled to the downstream port 124 via interface 134 (e.g., a physical transmission medium).

Without a security check in the external component 140, the processor 100 would be vulnerable via the coherent interface port 122. If a security check were provided in the external component 140 for the coherent interface 132, existing software stack does not have a mechanism to keep the two security checks synchronized with one another and this architecture violates the requirement for the security check to be at the root of a hierarchy.

The BIOS extends the root complex 130 beyond the root complex circuitry 120 to encompass the external component 140. The BIOS obfuscates the downstream port 124c from the OS. To obfuscate the downstream port 124c from the OS, the BIOS may set a control bit in the root complex circuitry 120. The downstream port 124c and the accessory functions of the downstream port 124c may be obfuscated to not be visible to the OS.

The BIOS defines a virtual root bridge for the external component 140 (e.g., by an advanced configuration and power interface (ACPI) mechanism). The virtual root bridge may be an ACPI virtual root bridge (e.g., ACPI virtual root bridge). The ACPI virtual root bridge may be defined over the coherent interface 132 and interfaces 134 that couple the external component 140 and the root complex circuitry 120. Resources of the virtual root bridge may be programmed and/or mapped through the designated downstream port 124c. In one embodiment, at least one of bus numbers, memory mapped input/output (MMIO), or input/output ports (IO Ports) are carved out from an existing root bus of the processor 110 to create the virtual root bridge. The external component may to use the at least one of the bus numbers, the MMIO, and the IO Ports.

The BIOS enables a security check 142 at the external component 140 to provide protection for the coherent interface 132 and the downstream port 124c. The security check 142 covers both the coherent interface 132 and the interface 134c. The BIOS may disable the security check 126c in the root complex circuitry 120, where the security check 126c corresponds to the downstream port 124c. The security check 142 enabled at the external component 140 may have the same features and capability as the security check 126c that is disabled in the root complex circuitry 120. Disabling the security check 126c in the root complex circuitry 120 and enabling the security check 142 in the external component 140 complies with root complex hierarchy (e.g., security check 126c is to be disabled because software stack may not have a mechanism to keep security checks 126c and 142 synchronized with one another as this architecture would violate the requirement that the security check must be at the root of hierarchy).

The BIOS may define a functional unit (e.g., AFU 146) of the external component 140 as root complex integrated endpoint (RCiEP) 144 and assign the RCiEP to the virtual root bridge.

The root complex 130 is extended outside the processor 100 over the hidden downstream port 124c and facilitates extension of the security domain of the root complex to the new virtual root bridge for the external component 140. The root complex 130 may be extended in a software transparent way so that functionalities available in root complex 130 (e.g. security) are extended to the external component 140 to allow devices and components behind the coherent interface 132 and interface 134c (e.g., AFU 146) to access the processor 100 (e.g., platform resources) without comprising the processor 100 (e.g., assets of processor 100). The root complex 130 that is extended to encompass the external component provides equivalent security protection to all components and devices within the root complex 130 from misbehaving and rogue functions.

Once the BIOS flow is complete and the system is handed over to the OS, the OS finds all the configured AFU 146 devices on the virtual root bridge with proper resources defined through ACPI mechanisms as RCiEP with security check at the root of the virtual root bridge. Software may see all functionalities (e.g., AFU 146) in the external component 140 as part of the virtual root bridge and at the root of the hierarchy. The processor 100 may be on a first die (e.g., a first integrated circuit on a first die) and the external component 140 may be on a second die (e.g., a second integrated circuit on a second die). The devices (e.g. functions, AFU 146) embedded (e.g., built) in the external component 140 may be exposed (e.g., defined) as integrated devices (e.g., RCiEPs) to the OS (e.g., to the processor 100, to the first integrated circuit on the first die).

Components and devices on the external component 140 (e.g., accelerator function in FPGA) may be defined (e.g., exposed) as RCiEP and may be assigned under the purview of the virtual root bridge (e.g., with BIOS changes and no OS (e.g., native system) or hypervisor (e.g., virtualized system) changes, devices external to the processor core 110 may look like part of the root complex 130 (e.g., to software, OS)). The external component 140 may include one or more RCiEP 144, each RCiEP 144 corresponding to a corresponding AFU 146 on the external component 140. The BIOS may assign the one or more RCiEP 144 to the virtual root bridge.

In certain implementations, the root complex circuitry includes a plurality of downstream ports 124 (e.g., 124a-c). The root complex circuitry 120 may be coupled to the external component 140 via at least two downstream ports 124 and the coherent interface port (e.g., the coherent interface 132 couples the coherent interface port 122 and the external component 140, the interface 134c couples the downstream port 124c and the external component, and the interface 134b couples the downstream port 124b and the external component 140). The BIOS may extend the root complex 130 beyond the root complex circuitry 120 to encompass the external component by obfuscating the two or more downstream ports 124 that are coupled to the external component 140 (e.g., downstream ports 124b-c), defining a virtual root bridge for the external component 140, and enabling a security check 142 in the external component to provide protection for the coherent interface port 122 and the two or more downstream ports 124 coupled to the external component 140 (e.g., downstream ports 124b-c). The BIOS may disable the security checks that correspond to the two or more downstream ports 124 coupled to the external component 140 (e.g., downstream ports 124b-c). The BIOS may set one or more control bits in the root complex circuitry 120 to obfuscate the two or more downstream ports 124. Only one of the downstream ports 124 may be used by BIOS to enumerate and configure the AFU 146 devices and the other downstream ports 124 may be used as data paths for direct memory access (DMA) from AFUs.

The processor 100 may include a processor cache 112 (e.g., system cache, cache of computing platform 150, etc.) and the external component 140 may include an external component cache 148 that is coherent with processor cache 112. The coherent interface port 122 may allow maintaining cache coherency between the processor 100 and the external component 140 (e.g., between processor cache 112 and external component cache 148). The processor cache 112 is protected by the security check 142 and the external component cache 148 reflects the secure processor cache 112 as a result of cache coherency. The external component 140 may build an external component cache 148 that is coherent with processor cache 112. In one embodiment, the external component cache 148 is built (e.g., a first instantiation) in the external component 140 subsequent to (e.g., in response to) the external component 140 connecting to the processor 100 via the coherent interface port 122. In another implementation, the external component cache 148 exists in external component 140 prior to coupling of the external component 140 to processor 100 via the coherent interface port 122, but the external component cache 148 is not protected by security check 142 until the external component 140 connects with the processor 100 via coherent interface port 122.

Figure 2:
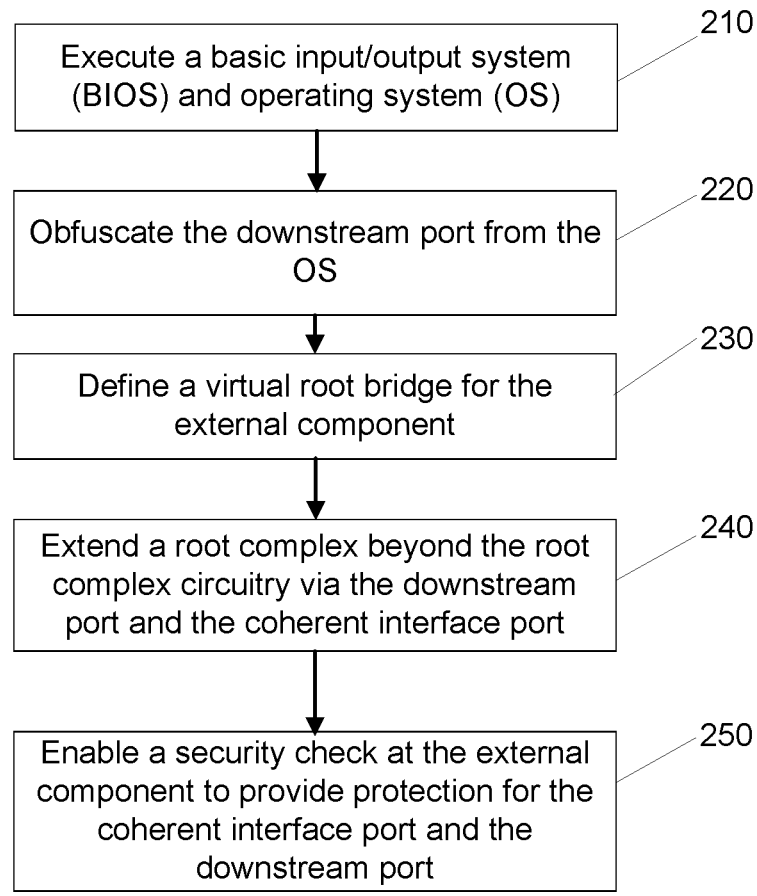
FIG. 2 is a flow diagram of a method of extending a root complex to encompass an external component, according to one embodiment.

FIG. 2 is a flow diagram of a method 200 of extending a root complex 130 to encompass an external component, according to one embodiment. Method 200 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 200 may be performed, in part, by a processor 100 or processor core 110 described above with respect to FIG. 1.

For simplicity of explanation, the method 200 is depicted and described as a series of acts. However, acts in accordance with this disclosure can occur in various orders and/or concurrently and with other acts not presented and described herein. Furthermore, not all illustrated acts may be performed to implement the method 200 in accordance with the disclosed subject matter. In addition, those skilled in the art will understand and appreciate that the method 200 could alternatively be represented as a series of interrelated states via a state diagram or events.

Referring to FIG. 2, at 210 the processing logic executes (e.g., via a processor core 110 of a processor 100) a BIOS and an OS. The processor core 110 is coupled to the root complex circuitry 120 of the processor 100 and the root complex circuitry 120 includes a downstream port 124c and a coherent interface port 122.

At block 220, the processing logic obfuscates (e.g., via the BIOS) the downstream port 124c from the OS. Block 220 may include setting (e.g., by the BIOS) a control bit in the root complex circuitry to obfuscate the downstream port 124c.

At block 230, the processing logic defines (e.g., via the BIOS) a virtual root bridge for the external component 140.

At block 240, the processing logic extends (e.g., via the BIOS) a root complex 130 beyond the root complex circuitry 120 via the downstream port 124c and the coherent interface port 122.

At block 250, the processing logic enables (e.g., via the BIOS) a security check 142 at the external component 140 to provide protection for the coherent interface port 122 and the downstream port 124c.

In one embodiment, processing logic further defines (e.g., by the BIOS) a functional unit of the external component 140 as an RCiEP 144. The processing logic may further assign (e.g., by the BIOS) the RCiEP 144 to the virtual root bridge.

In one embodiment, processing logic disables the security check 126c in the root complex circuitry 120 that corresponds to the downstream port 124c.

Figure 3B:
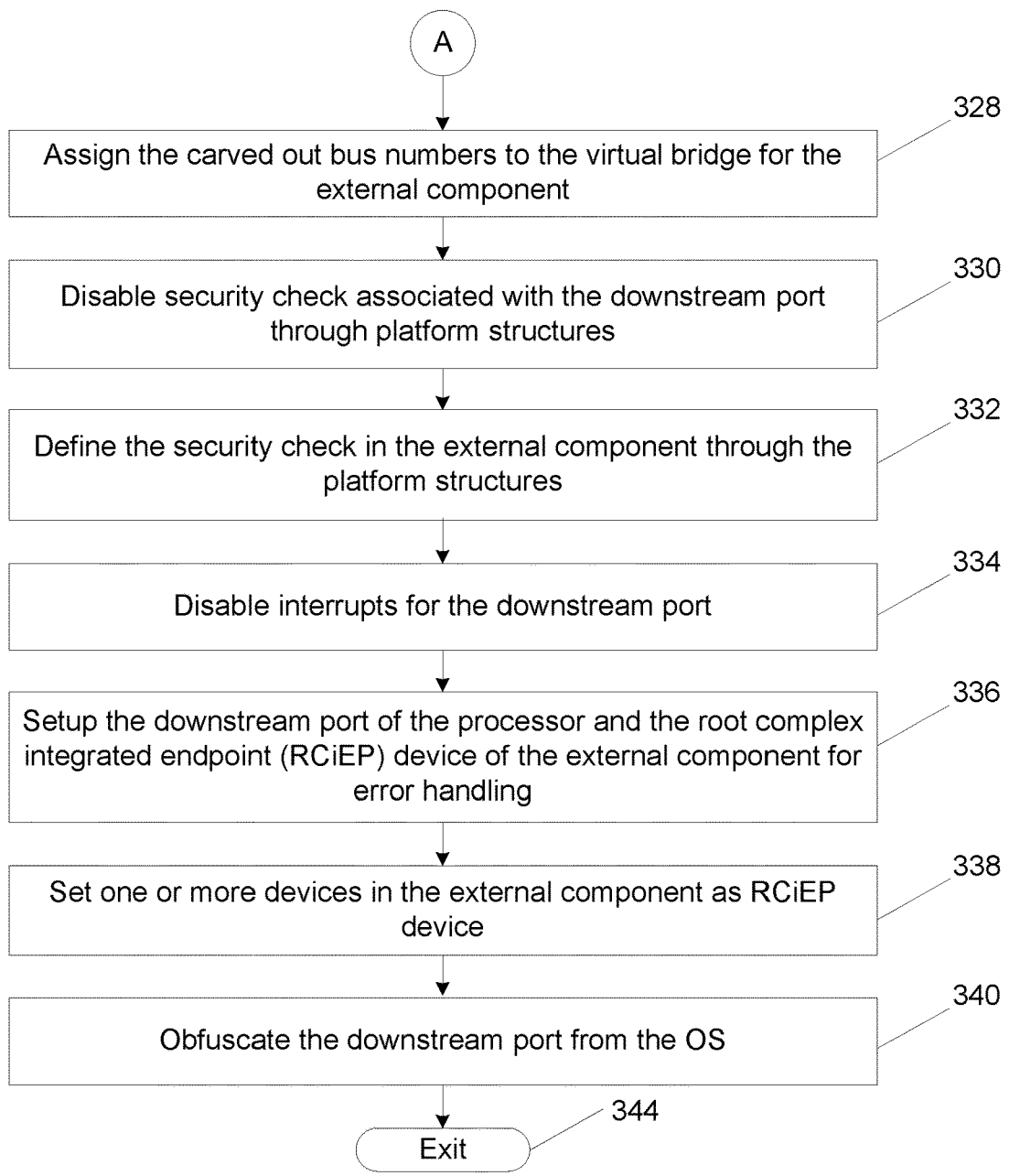

FIGS. 3A-B illustrate a flow diagram of a method 300 of extending a root complex 130 to encompass an external component 140, according to one embodiment. Method 300 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 300 may be performed, in part, by a processor 100 or processor core 110 described above with respect to FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIGS. 3A-B, at 302 the processing logic performs a cold boot or platform reset (e.g., for processor 100, for processor core 110).

At block 304, the processing logic determines whether an external component 140 is coupled to the processor 100 (e.g., via coherent interface port 122 and a downstream port 124). If an external component 140 is not coupled to the processor 100, the flow continues to block 306. If an external component 140 is coupled to the processor 100 (e.g., via coherent interface port 122 and downstream port 124), flow continues to block 310.

At block 306, the processing logic executes normal BIOS flow and flow continues to block 308 to exit method 300.

At block 310, the processing logic performs device discovery and enumeration as part of boot flow in the BIOS. In one embodiment, the processing logic performs standard device enumeration and programming as part of boot flow in the BIOS.

At block 312, the processing logic assigns resources (e.g., bus/device/function (BDF), memory mapped input/output (MMIO), interrupts) to devices under hierarchy of downstream port 124c (e.g., one or more devices coupled to the processor via downstream port 124c, where downstream port is within root complex 130).

At block 314, the processing logic assigns one or more resources (e.g., MMIO) to downstream port 124c based on the resources assigned to the devices under the hierarchy of the downstream port 124c.

At block 316, the processing logic carves out bus numbers (e.g., from a root bridge of the processor 100). The processing logic may carve out bus numbers based on platform requirements. In one example, the processing logic carves out bus numbers F0:FE for a single socket (1S) system. In one example, the processing logic carves out bus numbers 70:7E (socket0 external component) and F0:FE (socket1 external component) for a dual socket (2S) system.

At block 318, the processing logic reprograms the downstream port 124c per the carved out bus numbers. In one example, for a 1S system, downstream port 124c is reprogrammed (e.g., Sec Bus=0xF0, SubBus=0xFE). In one example, for a 2S system, downstream port 124c is reprogrammed (e.g., Sec Bus=0x70, SubBus=0x7E–Socket0ExternalComponent and Sec Bus=0xF0, SubBus=0xFE–Socket1ExternalComponent). The SubBus value may be adjusted based on the number of downstream ports 124 connected to the external component 140 (e.g., FPGA).

At block 320, the processing logic allocates resources for a security check 142 in the external component 140. The security check 142 may have the same features and capability of security check 126c in root complex circuitry 120.

At block 322, the processing logic adjusts a resource (e.g., MMIO) to downstream port 124c to include resources assigned to the security check 142.

At block 324, the processing logic carves out resource (e.g., MMIO) of the downstream port 124c from a root bridge (e.g., ACPI root bridge) of the processor 100 (e.g., root complex 130 of processor 100).

At block 326, the processing logic defines and assigns the resource (e.g., MMIO) of the downstream port 124c to a virtual root bridge (e.g., an ACPI virtual root bridge) in the external component 140.

At block 328, the processing logic assigns the carved out bus numbers to the virtual root bridge (e.g., an ACPI virtual root bridge) in the external component 140. The resource carved out from the root bridge (e.g., ACPI root bridge) of the processor 100 matches the resource assigned to the virtual root bridge (e.g., an ACPI virtual root bridge) in the external component 140.

At block 330, the processing logic disables the security check 126c associated with the downstream port 124c through corresponding platform structures (e.g., ACPI table associated with the security check 126c) In one embodiment, the processing logic removes remapping reporting structure (e.g., ACPI direct memory access (DMA) remapping reporting structure) for the security check 142.

At block 332, the processing logic defines (and/or exposes) the security check 142 associated with the external component 140 through the platform structures to use the security check 142 for transactions (e.g., transactions over the downstream port 124c and transactions over the coherent interface port 122) initiated from the external component 140. In one embodiment, the processing logic remaps the reporting structure (e.g., ACPI DMA remapping reporting structure) for the security check 142 in the external component 140. The device scope structure may show the RCiEPs 144 of the external component 140.

At block 334, the processing logic disables interrupts for downstream port 124c. The processing logic may disable legacy interrupts (INTx interrupts) for the RCiEP 144 of the external component 140.

At block 336, the processing logic sets up downstream port 124c and RCiEP 144 (e.g., RCiEP device) of the external component 140 (e.g., for "firmware first model") for error handling (e.g., structure management interrupt (SMI) code).

At block 338, the processing logic sets one or more devices in the external component 140 as RCiEP 144 (e.g., set all devices in the external component 140 as RCiEP devices).

At block 340, the processing logic obfuscates the downstream port 124c from the OS (e.g., hides from OS visibility the downstream port 124c that is connected to the external component 140) and flow continues to block 344 to exit method 300.

Figure 4:
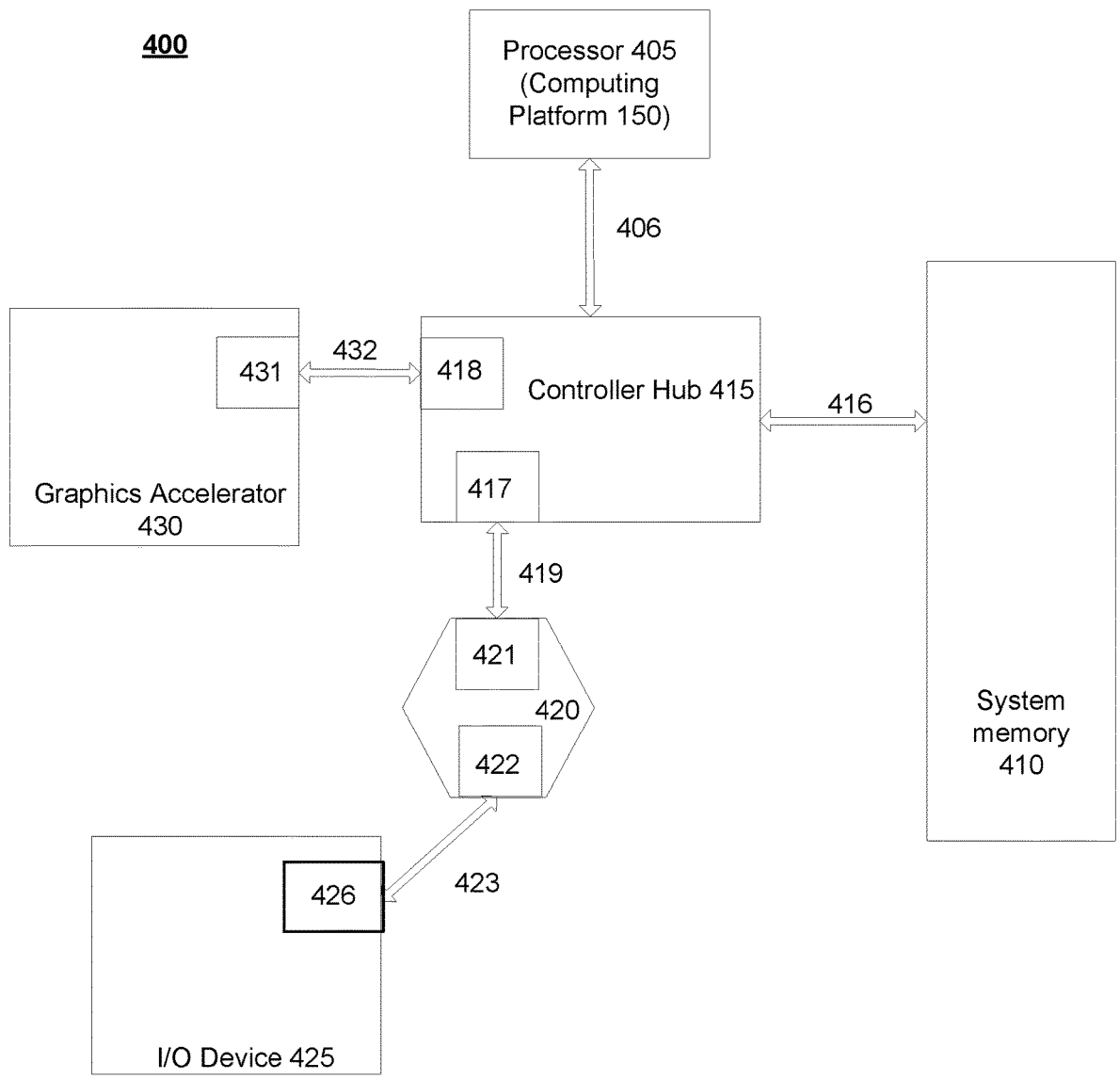
FIG. 4 illustrates a computing system with multiple interconnects with adjacent pattern prediction logic, according to certain embodiments.

FIG. 4 illustrates a computer system 400 with multiple interconnects, according to one embodiment. System 400 includes processor 405 and system memory 410 coupled to controller hub 415. Processor 405 includes any processing element, such as a microprocessor, a host processor, an embedded processor, a co-processor, or other processor. In one embodiment, processor 405 is the computing platform 150 that includes a processor 100 and an external component 140 within a root complex 130. Processor 405 is coupled to controller hub 415 through front-side bus (FSB) 406. In one embodiment, FSB 406 is a serial point-to-point interconnect as described below. In another embodiment, FSB 406 (e.g., link) includes a serial, differential interconnect architecture that is compliant with different interconnect standards. In another embodiment, the FSB 406 is coupled to RCiEP 144 that is within the external component 140 and the root complex 130 of processor 405 (computing platform 150). In one embodiment, one or more components (e.g., controller hub 415, etc.) of system 400 are part of processor 405 (computing platform 150). For example, controller hub 415 and system memory 410 may be part of processor 405 (computing platform 150). If controller hub 415 is part of root complex circuitry 120, input/output modules 417 and 418 may be downstream ports 124.

System memory 410 includes any memory device, such as random access memory (RAM), non-volatile (NV) memory, or other memory accessible by devices in system 400. System memory 410 is coupled to controller hub 415 through memory interface 416. Examples of a memory interface include a double-data rate (DDR) memory interface, a dual-channel DDR memory interface, and a dynamic RAM (DRAM) memory interface.

In one embodiment, controller hub 415 is a root hub, root complex, or root controller. Examples of controller hub 415 include a chipset, a memory controller hub (MCH), a north bridge, an interconnect controller hub (ICH) a south bridge, and a root controller/hub. Often the term chipset refers to two physically separate controller hubs, i.e. a memory controller hub (MCH) coupled to an interconnect controller hub (ICH). Note that current systems often include the MCH integrated with processor 405, while controller 415 is to communicate with I/O devices, in a similar manner as described below. In some embodiments, peer-to-peer routing is optionally supported through root complex (e.g., controller 415).

Here, controller hub 415 is coupled to switch/bridge 420 through serial link 419. Input/output modules 417 and 421, which may also be referred to as interfaces/ports 417 and 421, include/implement a layered protocol stack to provide communication between controller hub 415 and switch 420. In one embodiment, multiple devices are capable of being coupled to switch 420.

Switch/bridge 420 routes packets/messages from device 425 upstream, i.e. up a hierarchy towards a root complex, to controller hub 415 and downstream, i.e. down a hierarchy away from a root controller, from processor 405 or system memory 410 to device 425. Switch 420, in one embodiment, is referred to as a logical assembly of multiple virtual PCI-to-PCI bridge devices (bridge devices that communicate according to a PCI protocol). Device 425 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Fire wire device, a Universal Serial Bus (USB) device, a scanner, and other input/output devices. Often in the PCIe® vernacular, such as device, is referred to as an endpoint. Although not specifically shown, device 425 may include a PCIe® to PCI/PCI-X bridge to support devices that communicate according to the legacy protocol, PCI protocol, etc. Endpoint devices that communicate according to PCIe® standard are often classified as legacy, PCIe®, or root complex integrated endpoints (RCiEP).

Graphics accelerator 430 is also coupled to controller hub 415 through serial link 432. In one embodiment, graphics accelerator 430 is coupled to an MCH, which is coupled to an ICH. Switch 420, and accordingly I/O device 425, is then coupled to the ICH. I/O modules 431 and 418 are also to implement a layered protocol stack to communicate between graphics accelerator 430 and controller hub 415. Similar to the MCH discussion above, a graphics controller or the graphics accelerator 430 itself may be integrated in processor 405.

I/O device 425 includes an interface 426 and switch/bridge 420 includes an interface 422. Interface 426 is coupled to interface 422 via serial link 423.

In one embodiment, short range wireless engines including a WLAN unit and a Bluetooth® unit may couple to processor 405 via an interconnect according to a PCIe® protocol, e.g., in accordance with the PCI Express® Specification Base Specification version 4.0 (Base Specification Revision 4.0 Version 0.3 published Feb. 19, 2014, etc.), or another such protocol such as a serial data input/output (SDIO) standard. Of course, the actual physical connection between these peripheral devices, which may be configured on one or more add-in cards, can be by way of the NGFF connectors adapted to a motherboard. Using WLAN unit, Wi-Fi® communications in accordance with a given Institute of Electrical and Electronics Engineers (IEEE) 802.11 standard can be realized, while via a unit using the Bluetooth® technology, short range communications via a Bluetooth® protocol can occur. In another embodiment, these units may communicate with processor 405 via, e.g., a USB link or a universal asynchronous receiver transmitter (UART) link.

Turning next to FIG. 5, an embodiment of a system on-chip (SOC) design in accordance with the disclosures is depicted. As a specific illustrative example, SOC 500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 500 includes 2 cores-506 and 507. Similar to the discussion above, cores 506 and 507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 506 and 507 are coupled to cache control 508 that is associated with bus interface unit 509 and L2 cache 504 to communicate with other parts of system 500. Interconnect 510 includes an on-chip interconnect, such as an IOSF, AMBA, or other interconnect discussed above, which potentially implements one or more aspects of the described disclosure.

SOC 500 may include root complex circuitry 120 that is coupled to one or both of cores 506 and 507. The SOC 500 may include downstream port 124 and coherent interface port 122 (e.g., within the root complex circuitry 120). An external component 140 may be coupled to SOC 500 via downstream port 124 and coherent interface port 122. A root complex 130 may be extended to encompass the external component 140.

Interface 510 provides communication channels to the other components, such as a Subscriber Identity Module (SIM) 530 to interface with a SIM card, a boot rom 535 to hold boot code for execution by cores 506 and 507 to initialize and boot SOC 500, a SDRAM controller 540 to interface with external memory (e.g. DRAM 560), a flash controller 545 to interface with non-volatile memory (e.g. Flash 565), a peripheral control 550 (e.g. Serial Peripheral Interface) to interface with peripherals, video codecs 520 and Video interface 525 to display and receive input (e.g. touch enabled input), GPU 515 to perform graphics related computations, etc. Any of these interfaces may incorporate aspects of the disclosure described herein.

Interconnect 510 may connect with another component via a physical transmission medium (e.g., on-chip interconnect, IOSF, AMBA, or other interconnect).

In addition, the system illustrates peripherals for communication, such as a Bluetooth® module 570, 3G modem 575, GPS 585, and Wi-Fi® 585. Note as stated above, a UE includes a radio for communication. As a result, these peripheral communication modules are not all required. However, in a UE some form a radio for external communication is to be included.

The following examples pertain to further embodiments.

Example 1 is a processor comprising: a processor core, the processor core to execute a basic input/output system (BIOS) and an operating system (OS); and root complex circuitry coupled to the processor core, wherein the root complex circuitry comprises a coherent interface port and a downstream port, the root complex circuitry to couple to an external component via the downstream port and the coherent interface port, wherein the BIOS, to extend a root complex beyond the root complex circuitry to encompass the external component, is to obfuscate the downstream port from the OS, define a virtual root bridge for the external component, and enable a security check at the external component to provide protection for the coherent interface port and the downstream port.

In Example 2, the processor of Example 1, wherein the BIOS, to obfuscate the downstream port from the OS, sets a control bit in the root complex circuitry.

In Example 3, the processor of any one of Examples 1-2, wherein the BIOS is to define a functional unit of the external component as a root complex integrated endpoint (RCiEP) and assign the RCiEP to the virtual root bridge.

In Example 4, the processor of any one of Examples 1-3, wherein the BIOS is to disable a first security check in the root complex circuitry, wherein the first security check corresponds to the downstream port, wherein disabling the first security check in the root complex circuitry and enabling the security check in the external component complies with root complex hierarchy.

In Example 5, the processor of any one of Examples 1-4, wherein: the root complex circuitry comprises a second downstream port; the root complex circuitry to couple to the external component via the second downstream port, the downstream port, and the coherent interface port; and the BIOS, to extend the root complex beyond the root complex circuitry to encompass the external component, is to further obfuscate the second downstream port from the OS.

In Example 6, the processor of any one of Examples 1-5, wherein the external component comprises one or more root complex integrated endpoints (RCiEP), each RCiEP corresponds to a corresponding accelerator function unit (AFU) on the external component, and the BIOS is to assign the one or more RCiEP to the virtual root bridge.

In Example 7, the processor of any one of Examples 1-6, wherein the external component is a field-programmable gate array (FPGA).

In Example 8, the processor of any one of Examples 1-7, wherein the processor comprises a processor cache and the external component comprises an external component cache that is coherent with the processor cache, wherein the processor cache is protected by the security check at the external component.

In Example 9, the processor of any one of Examples 1-8, wherein bus numbers and memory mapped input/output (MMIO) are carved out from an existing root bus of the processor to create the virtual root bridge, wherein the external component is to use the bus numbers and the MMIO.

Example 10 is a method comprising: executing, by a processor core of a processor, a basic input/output system (BIOS) and an operating system (OS), the processor core being coupled to root complex circuitry of the processor, an external component being coupled to the root complex circuitry via a downstream port of the root complex circuitry and a coherent interface port of the root complex circuitry; obfuscating, via the BIOS, the downstream port from the OS; defining, via the BIOS, a virtual root bridge for the external component; extending, via the BIOS, a root complex beyond the root complex circuitry to encompass the external component; and enabling, via the BIOS, a security check at the external component to provide protection for the coherent interface port and the downstream port.

In Example 11, the method of Example 10, wherein the obfuscating comprises setting, by the BIOS, a control bit in the root complex circuitry.

In Example 12, the method of any one of Examples 10-11 further comprising: defining, via the BIOS, a functional unit of the external component as a root complex integrated endpoint (RCiEP); and assigning, via the BIOS, the RCiEP to the virtual root bridge.

In Example 13, the method of any one of Examples 10-12 further comprising disabling, via the BIOS, a first security check in the root complex circuitry, wherein the first security check corresponds to the downstream port.

In Example 14, the method of any one of Examples 10-13, wherein: the root complex circuitry comprises a second downstream port; the root complex circuitry to couple to the external component via the second downstream port, the downstream port, and the coherent interface port; and the method further comprises obfuscating the second downstream port from the OS.

In Example 15, the method of any one of Examples 10-14, wherein the external component comprises one or more root complex integrated endpoints (RCiEP), each RCiEP corresponds to a corresponding accelerator function unit (AFU) on the external component, and the method further comprises assigning, via the BIOS, the one or more RCiEP to the virtual root bridge.

In Example 16, the method of any one of Examples 10-15, wherein the external component is a die coupled to a plurality of devices.

Example 17 is a system comprising: a first integrated circuit comprising: a core, the core to execute a basic input/output system (BIOS) and an operating system (OS); and uncore circuitry coupled to the core, the uncore circuitry comprising a downstream port and a coherent interface port; and a second integrated circuit coupled to the uncore circuitry via the downstream port and via the coherent interface port, wherein the BIOS, to extend a root complex beyond the uncore circuitry to encompass the second integrated circuit, is to obfuscate the downstream port from the OS, define a virtual root bridge for the second integrated circuit, and enable a security check at the second integrated circuit to provide protection for the coherent interface port and the downstream port.

In Example 18, the system of Example 17, wherein the BIOS, to obfuscate the downstream port from the OS, sets a control bit in the uncore circuitry.

In Example 19, the system of any one of Examples 17-18, wherein the BIOS is to define a functional unit of the second integrated circuit as a root complex integrated endpoint (RCiEP) and assign the RCiEP to the virtual root bridge.

In Example 20, the system of any one of Examples 17-19, wherein the BIOS is to disable a first security check in the uncore circuitry, wherein the first security check corresponds to the downstream port.

In Example 21, the system of any one of Examples 17-20, wherein: the uncore circuitry comprises a second downstream port; the uncore circuitry to couple to the second integrated circuit via the second downstream port, the downstream port, and the coherent interface port; and the BIOS, to extend the root complex beyond the uncore circuitry to encompass the second integrated circuit, is to further obfuscate the second downstream port from the OS.

In Example 22, the system of any one of Examples 17-21, wherein the second integrated circuit comprises one or more root complex integrated endpoints (RCiEP), each RCiEP corresponds to a corresponding accelerator function unit (AFU) on the second integrated circuit, and the BIOS is to assign the one or more RCiEP to the virtual root bridge.

In Example 23, the system of any one of Examples 17-22, wherein the first integrated circuit is on a first die and the second integrated circuit is on a second die, wherein devices embedded in the second integrated circuit are exposed as integrated devices to the OS.

Example 24 is an apparatus comprising means to perform a method of any one of Examples 10-16.

Example 25 is at least one machine readable medium comprising a plurality of instructions, wherein executed, to implement a method or realize an apparatus of any of Examples 10-16.

Example 26 is an apparatus comprising means for performing the method of any one of Examples 10-16.

Example 27 is an apparatus comprising a processor configured to perform the method of any one of Examples 10-16.

Various embodiments can have different combinations of the structural features described above. For instance, all optional features of the computing system described above can also be implemented with respect to the method or process described herein and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments may be described with reference to timestamp validation of components in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EE- PROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "executing," "obfuscating," "defining," "extending," "enabling," "assigning," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A processor comprising:
    a processor core, the processor core to execute a basic input/output system (BIOS) and an operating system (OS); and
    root complex circuitry coupled to the processor core, wherein the root complex circuitry comprises a coherent interface port and a downstream port, the root complex circuitry to couple to an external component via the downstream port and the coherent interface port, wherein the BIOS, to extend a root complex beyond the root complex circuitry to encompass the external component, is to obfuscate the downstream port from the OS, define a virtual root bridge for the external component, and enable a security check at the external component to provide protection for the coherent interface port and the downstream port.

2. The processor of claim 1, wherein the BIOS, to obfuscate the downstream port from the OS, sets a control bit in the root complex circuitry.

3. The processor of claim 2, wherein the BIOS is to define a functional unit of the external component as a root complex integrated endpoint (RCiEP) and assign the RCiEP to the virtual root bridge.

4. The processor of claim 1, wherein the BIOS is to disable a first security check in the root complex circuitry, wherein the first security check corresponds to the downstream port, wherein disabling the first security check in the root complex circuitry and enabling the security check in the external component complies with root complex hierarchy.

5. The processor of claim 1, wherein:
    the root complex circuitry comprises a second downstream port;

the root complex circuitry is to couple to the external component via the second downstream port, the downstream port, and the coherent interface port; and the BIOS, to extend the root complex beyond the root complex circuitry to encompass the external component, is to further obfuscate the second downstream port from the OS.

6. The processor of claim 1, wherein the external component comprises one or more root complex integrated endpoints (RCiEP), each RCiEP corresponds to a corresponding accelerator function unit (AFU) on the external component, and the BIOS is to assign the one or more RCiEP to the virtual root bridge.

7. The processor of claim 1, wherein the external component is a field-programmable gate array (FPGA).

8. The processor of claim 1, wherein the processor comprises a processor cache and the external component comprises an external component cache that is coherent with the processor cache, wherein the processor cache is protected by the security check at the external component.

9. The processor of claim 1, wherein bus numbers and memory mapped input/output (MMIO) are carved out from an existing root bus of the processor to create the virtual root bridge, wherein the external component is to use the bus numbers and the MMIO.

10. A method comprising:
executing, by a processor core of a processor, a basic input/output system (BIOS) and an operating system (OS), the processor core being coupled to root complex circuitry of the processor, an external component being coupled to the root complex circuitry via a downstream port of the root complex circuitry and a coherent interface port of the root complex circuitry;
obfuscating, via the BIOS, the downstream port from the OS;
defining, via the BIOS, a virtual root bridge for the external component;
extending, via the BIOS, a root complex beyond the root complex circuitry to encompass the external component; and
enabling, via the BIOS, a security check at the external component to provide protection for the coherent interface port and the downstream port.

11. The method of claim 10, wherein the obfuscating comprises setting, by the BIOS, a control bit in the root complex circuitry.

12. The method of claim 11 further comprising:
defining, via the BIOS, a functional unit of the external component as a root complex integrated endpoint (RCiEP); and
assigning, via the BIOS, the RCiEP to the virtual root bridge.

13. The method of claim 10 further comprising disabling, via the BIOS, a first security check in the root complex circuitry, wherein the first security check corresponds to the downstream port.

14. The method of claim 10, wherein:
the root complex circuitry comprises a second downstream port;
the root complex circuitry is to couple to the external component via the second downstream port, the downstream port, and the coherent interface port; and
the method further comprises obfuscating the second downstream port from the OS.

15. The method of claim 10, wherein the external component comprises one or more root complex integrated endpoints (RCiEP), each RCiEP corresponds to a corresponding accelerator function unit (AFU) on the external component, and the method further comprises assigning, via the BIOS, the one or more RCiEP to the virtual root bridge.

16. The method of claim 10, wherein the external component is a die coupled to a plurality of devices.

17. A system comprising:
a first integrated circuit comprising:
a core, the core to execute a basic input/output system (BIOS) and an operating system (OS); and
uncore circuitry coupled to the core, the uncore circuitry comprising a downstream port and a coherent interface port; and
a second integrated circuit coupled to the uncore circuitry via the downstream port and via the coherent interface port, wherein the BIOS, to extend a root complex beyond the uncore circuitry to encompass the second integrated circuit, is to obfuscate the downstream port from the OS, define a virtual root bridge for the second integrated circuit, and enable a security check at the second integrated circuit to provide protection for the coherent interface port and the downstream port.

18. The system of claim 17, wherein the BIOS, to obfuscate the downstream port from the OS, sets a control bit in the uncore circuitry.

19. The system of claim 18, wherein the BIOS is to define a functional unit of the second integrated circuit as a root complex integrated endpoint (RCiEP) and assign the RCiEP to the virtual root bridge.

20. The system of claim 17, wherein the BIOS is to disable a first security check in the uncore circuitry, wherein the first security check corresponds to the downstream port.

21. The system of claim 17, wherein:
the uncore circuitry comprises a second downstream port;
the uncore circuitry is to couple to the second integrated circuit via the second downstream port, the downstream port, and the coherent interface port; and
the BIOS, to extend the root complex beyond the uncore circuitry to encompass the second integrated circuit, is to further obfuscate the second downstream port from the OS.

22. The system of claim 17, wherein the second integrated circuit comprises one or more root complex integrated endpoints (RCiEP), each RCiEP corresponds to a corresponding accelerator function unit (AFU) on the second integrated circuit, and the BIOS is to assign the one or more RCiEP to the virtual root bridge.

23. The system of claim 17, wherein the first integrated circuit is on a first die and the second integrated circuit is on a second die, wherein devices embedded in the second integrated circuit on the second die are exposed as integrated devices to the OS.

* * * * *